Patented Sept. 7, 1943

2,328,622

UNITED STATES PATENT OFFICE 2,328,622

CORE OIL AND CORE

Charles E. Crawford, Cos Cob, Conn.

No Drawing. Application May 1, 1942,
Serial No. 441,371

7 Claims. (Cl. 22—188)

This invention relates to core oils or to core binders and to foundry cores produced by the aid thereof. The object of the invention is to provide core oil having certain advantages in its application to the molding sand and serving to produce a strong and resistant core. I obtain these results by utilizing as a base a mineral oil product such as that which at present may be obtained very cheaply under the name naphthenic extract and which comprises a high proportion of polymerizable naphthenic compounds which I utilize, as hereinafter described, to effect a strong cementive bond on the particles of the molding sand.

In the refining of crude mineral oils, as, for example, by the process described in the patent to Tuttle 2,041,308, May 19, 1936, after the crude oil is topped to remove the more volatile constituents, the paraffinic components valuable as lubricating oil are separated, leaving a residue of variable composition containing tars and naphthenic and asphaltic compounds, but chiefly naphthenic compounds substantially unoxidized and unpolymerized. This residue is a by-product hitherto of little economic value and ordinarily utilized as fuel and may be obtained cheaply on the market under the name "naphthenic extract," by which I will hereinafter identify such a compound or mixture as thus characteristically produced.

A characteristic example of such an extract such as I have successfully used is described by the following physical analysis:

| | |
|---|---|
| Specific gravity, 60 deg. F./60 deg. F. | 1.041 |
| Penetration, A. S. T. M., D5-25, 77 deg. F., 100 grams, 5 seconds | 84 |
| Saybolt furol viscosity, 210 deg. F. | 706 |
| Flash point, A. S. T. M. D92-33, deg. F. | 545 |
| Pouring point, deg. F. | Plus 125 |
| Neutralization number, A. S. T. M., D188-27T | 0.01 |

Naphthenic compounds in general are subject to slow oxidation on exposure to air and to polymerization and I utilize this in the present invention to form in situ in the body of the sand core an efficient cementing agent. For this purpose a catylizer or polymerization accelerator is used. The iron compound commonly known as iron naphthenate and sold as such may be utilized. Also cobalt linoleate or manganese linoleate may be used. In general those materials known to the paint trade as "drying accelerators" when soluble in the oily constituents which I use may be utilized as catalyzers and I shall herein refer to this ingredient of my core oil as a drying accelerator. It will be understood, of course, that the efficiency and desirability of such compounds will vary among themselves and some might be of comparatively little efficiency for the present purpose, but a routine experiment or test not in itself of an inventive nature will enable those skilled in the art to reject the less satisfactory accelerators.

The viscosity of the naphthenic extract is suitably reduced to permit easy handling and its efficient distribution throughout the interstices of the core material by diluting it with a suitable volatile petroleum solvent vehicle such as petroleum naphtha.

It is most advantageous to utilize also a suitable plasticizer to render the cementive film which is formed in the core more pliable, eliminating brittleness and strengthening the finished core. For this purpose dehydrated castor oil is eminently practical but in general the vegetable drying oils and such semi-drying oils as sardine or menhaden oil may be utilized, their value as drying oils not being primarily a factor when used in relatively minor proportion as in the preferred embodiment of the invention herein described. About one part of drying oil by volume to three parts of the residue would usually be suitable, the whole diluted with from two to five parts by volume of petroleum naphtha.

Rosin or other natural or synthetic resins or gums may likewise be used, if desired, and likewise petroleum adulterants.

As further examples of plasticizers I may instance phthalates such as dibutyl phthalate and phosphates such as tricresyl phosphate. If these compounds are employed, they should not be used in greater proportion than about 25% of the true binding material, to wit, the naphthenic extract. In contrast when a drying type oil is used as a plasticizer, it has in itself certain binding properties when oxidized in the core and hence the limited amount thereof specified above by way of an example is recommended by me as a preferential use thereof in order most fully to utilize the binding effect of the naphthenic residue and from economic considerations, as clearly a mixture embodying chiefly drying oil would more nearly approach in cost the expensive compositions based on such oils already known and also would display to a relatively limited degree only the characteristic technical and economic advantages envisaged by the present invention through the utilization of the naphthenic extract.

A typical example of a core oil compounded in accordance with the foregoing principles is the following:

| | Per cent by volume |
|---|---|
| Petroleum naphthenic extract | 35.3 |
| Dehydrated castor oil | 11.8 |
| Petroleum naphtha | 52.3 |
| Iron naphthenate | 0.5 |
| Oil of sassafras (masking scent) | 0.1 |
| | 100.0 |

It will be understood that a mixture such as that just described is mixed with the molding sand and the core formed in the usual manner. The core is then baked in an oven at the desired temperature, usually to about 425° F. The petroleum naphtha, being a mere diluent material, evaporates and disappears. Under the action of the catalyzer the constituents of the naphthenic extract are modified to provide a film exerting a strong concreting action on the core material. As is usual, when the molten metal is poured against the cores, the binder oxidizes or burns so that the sand may be easily removed from the castings when cooled.

An oil in accordance with my invention may be of low viscosity so that it quickly penetrates and evens out in the sand. The ordinary core oils, primarily based on the expensive vegetable drying oils, if similarly diluted, would produce a weak bond, not necessarily because there would be no more solids present but because of the lesser cementive nature of the materials produced in the core by baking as compared with those produced in the case of the oil of the present invention. The ability of the present oil to wet the sand is greater than in the case of conventional core oils.

A strong core is produced by the use of the material herein described, one having higher tensile strength than those produced with the use of the conventional core oils with which I am familiar. It is also resistant to moisture, a factor of importance when the cores are not to be immediately used.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A core oil containing a naphthenic extract diluted to low viscosity with a petroleum solvent and including a drying accelerator soluble therein.

2. A core oil containing a naphthenic extract together with a plasticizer diluted to low viscosity with a petroleum solvent and including a drying accelerator soluble therein.

3. A core oil containing a naphthenic extract together with a drying or semi-drying oil as a plasticizer diluted to low viscosity with a petroleum solvent and including a drying accelerator soluble therein.

4. A core oil comprising naphthenic extract about a third by weight, a drying or semi-drying oil about an eighth by weight, a dryer of the group consisting of iron naphthenate, cobalt linoleate and manganese linoleate, the balance substantially being a petroleum solvent serving as a diluent vehicle.

5. A core oil comprising naphthenic extract about a third by weight, a drying or semi-drying oil about an eighth by weight, together with a drying accelerator, the balance substantially being a petroleum solvent serving as a diluent vehicle.

6. A sand mold for foundry use comprising a concreted body of molding sand and including as a cementing agent between the sand particles the heat oxidized and polymerized product of a naphthenic extract.

7. A sand mold for foundry use comprising a body of molding sand cemented together by the heat oxidized and polymerized product of a naphthenic extract together with a plasticizer ingredient of oxidized drying or semi-drying oil.

CHARLES E. CRAWFORD.